Dec. 9, 1924.  1,518,642
W. L. R. EMMET
GRAVITY SEPARATOR
Filed April 25, 1923
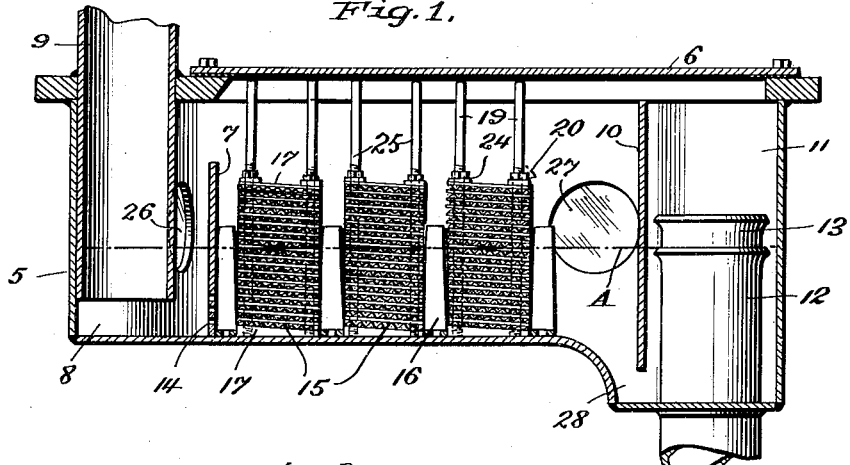
Fig. 1.
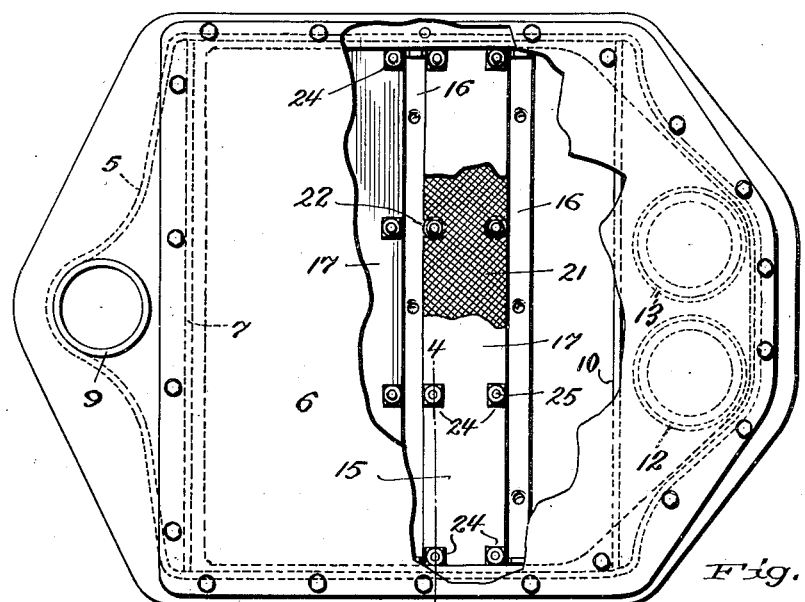
Fig. 2.
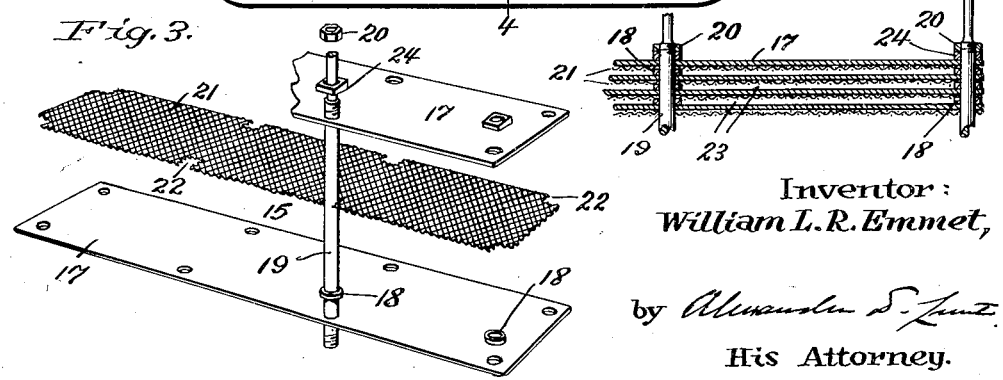
Fig. 3.
Fig. 4.
Inventor:
William L. R. Emmet,
by Alexander D. Lunt
His Attorney.

Patented Dec. 9, 1924.

1,518,642

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK.

GRAVITY SEPARATOR.

Application filed April 25, 1923. Serial No. 634,613.

*To all whom it may concern:*

Be it known that I, WILLIAM L. R. EMMET, a citizen of the United States, residing at Schenectady, county of Schenectady, State of New York, have invented certain new and useful Improvements in Gravity Separators, of which the following is a specification.

The present invention relates to separators for removing particles of foreign matter from liquid and while it is adapted for general application it is more particularly intended for use for separating foreign particles from the mercury used in a mercury vapor power system such as that disclosed in my Patent No. 1,167,158, patented January 4, 1916.

The object of my invention is to provide an improved separator, and for a consideration of what I believe to be novel and my invention, attention is directed to the accompanying description and the claims appended thereto.

In the drawing, Fig. 1 is a sectional view of a separator embodying my invention; Fig. 2 is a top plan view with the cover partly broken away; Fig. 3 is a perspective view of a screen and screen plate, and Fig. 4 is a detail sectional view taken on line 4—4, Fig. 2.

According to my invention, I provide a casing in which are arranged one or more stacks of transversely extending plates, the plates of each stack being spaced apart vertically so as to provide a plurality of passages through which the liquid flows. This arrangement serves, therefore, to divide the liquid as it flows through the separator into a number of strata. I then provide on the under surface of each plate means forming a plurality of shallow pockets or recesses in which dirt or other particles of foreign matter in the liquid can lodge. Preferably these pockets or recesses are formed by fastening to the under surface of each plate a wire screen of suitable mesh, the holes in the screen thus serving to provide the pockets or recesses. A liquid such as mercury does not wet foreign particles which may become entrained in it and such particles tend to float to the top of the liquid. In flowing between the plates, the top surface of the liquid comes into contact with the walls forming the pockets or recesses and any particles of foreign matter floating on the liquid will lodge in such pockets or recesses. By dividing the liquid into a number of strata each of which is relatively shallow, foreign particles have to rise but a short distance until they are floating on the top surface of a stratum.

Referring to the drawing, 5 indicates a casing having a top opening closed by a cover plate 6. At one end of casing 5 is an upwardly projecting baffle plate 7 which forms an admission chamber 8 into which depends an admission conduit 9 and at the other end is a depending baffle plate 10 which forms a discharge chamber 11 from which leads discharge conduits 12 and 13. 12 is the main discharge conduit. It terminates in chamber 11 at a height to define the liquid level desired in the casing, this being indicated by the line A. 13 is an auxiliary discharge conduit. It is slightly higher than conduit 12 and comes into play in case conduit 12 becomes clogged. Conduits 12 and 13 may lead to any suitable points. In baffle plate 7 are holes 14 for the passage of the liquid.

In the casing between baffle plates 7 and 10 are a number of separator elements 15, three being shown in the present invention, which extend transversely of the casing and are held between spacers 16 suitably fastened in the casing as by welding. Each spacer 16 comprises a cross-piece which lies on the bottom of the casing and two upturned ends which lie against the sides of the casing. The separator elements are not fastened to the casing but are held only between the spacers which permits the separator elements to be easily removed for cleaning.

Referring particularly to Figs. 3 and 4. each separator element comprises a stack of screen plates 17 held in spaced relation to each other by washers 18 and connected together by tie rods 19. The tie rods thread into openings in the lowermost plate 17 and are threaded at their upper ends to receive nuts 20 which screw down onto the top plate 17. Fastened to the underside of each screen plate is a screen 21 of suitable mesh, such screen having notches 22 for the passage of rods 19. The screens are held against the undersides of the screen plates by the washers 18. There are thus provided passages 23 between the plates, the top of each passage being formed by a screen which provides a plurality of pockets or recesses on the under surface of the plate. The bottom plates 17 are made wedge-shaped as shown in Fig. 1 so that all the plates stand at a slight angle whereby the upper faces provide surfaces which slope forwardly and downwardly in the direction of flow of liquid through the strainer. On the top plates beneath nuts 20 are wedge-shaped washers 24 to provide flat surfaces for the nuts to screw down onto. Rods 19 are provided with extensions 25 which reach to cover plate 6. These extensions serve as handles for use in lifting the separator or elements out of the casing and co-operate with the cover plate to hold them against movement in the casing when the cover plate is in place. In casing 5 is a glazed opening 26 through which the level of liquid in admission chamber 8 may be observed, and a glazed opening 27 through which the level beyond the last separator element 15 may be observed. At the discharge end of the casing is a sump 28 and baffle plate 10 depends into it to a point below the level of the bottom of casing 5 so as to form a liquid seal for chamber 11.

In use, the liquid enters through pipe 9 into chamber 8 and from there flows through the holes 14 in baffle plate 7 to the first separator element 15. The liquid then flows over the inclined top surfaces of the screen plates of the successive separator elements and thence under baffle plate 10 to the outlet conduit 12. As the liquid flows down the inclined surface the top surface of the liquid comes into contact with screens 21 and these screens catch any foreign particles or matter such as dirt which may be in the liquid and retain it. As pointed out above, a liquid such as mercury, for example, does not wet the particles and they tend to float to the top of the liquid so that they come into contact with the screens, and since the separator element divides the liquid into a number of strata the particles have to rise but a short distance to reach the surface of the mercury layers or strata. The plates are set at such an angle that the liquid in flowing down their inclined top surfaces is bound to come into contact with the screens, the arrangement being preferably such that the entrance edges of the plates are about in line with the discharge edges of the screens. As the screens of the first separator element 15 becomes clogged, the liquid level will rise higher and higher in admission chamber 8 and may finally rise above the top of such separator element. The second and third separator elements then begin to function more particularly, since they are in series with the first element. The extent to which the first separator element is clogged can be judged by observing through windows 26 and 27 the difference in level of the liquid in admission chamber 8 and the space beyond the last separator element and when this becomes excessive the separator elements can be removed and cleaned. This is easily accomplished by removing cover plate 6 and lifting the separator elements out.

By providing a sump 28 into which baffle plate 10 depends, the entrance to the discharge conduits is always sealed so that any dirt which may escape the separator elements and be floating on the surface of the liquid beyond the last separator element, will not find its way to the discharge conduits.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. In a liquid separator, a casing, and a separator element therein comprising a plurality of vertically-spaced plates defining liquid passages, and means on the under surface of each plate in spaced relation to the adjacent lower plate providing a plurality of recesses along each passage in which foreign floating particles may lodge.

2. In a liquid separator, a casing, a separator element therein comprising a plurality of vertically-spaced, inclined plates defining sloping liquid passages, and means on the under surface of each plate in spaced relation to the adjacent lower plate providing a plurality of recesses along each passage in which foreign floating particles may lodge.

3. In a liquid separator, a casing having an admission conduit at one end and a discharge conduit at the other end, and a transversely-arranged separator element in the casing between its ends, said separator element comprising a plurality of vertically-spaced, inclined plates, and a screen fastened against the under surface of each plate in spaced relation to the upper surface of the adjacent lower plate.

4. In a liquid separator, a casing having baffle plates at its ends forming admission and discharge chambers, admission and discharge conduits connected therewith, and a plurality of transverse separator elements through which the liquid flows arranged in spaced relation to each other within the casing between the baffle plates, each of said separator elements comprising a stack of vertically-spaced plates, and a screen fastened against the under surface of each plate in spaced relation to the upper surface of the adjacent lower plate.

5. In a liquid separator, a casing having top and bottom walls, an upwardly projecting transverse baffle plate within the casing forming an admission chamber at one end thereof, an admission conduit depending within said chamber, a depending transverse baffle plate within the casing forming a discharge chamber at the opposite end thereof, a liquid well into which said baffle plate depends to form a liquid seal, a discharge conduit projecting within the discharge chamber and providing therein an outlet opening above the liquid well, a plurality of transverse separator elements through which the liquid flows arranged in spaced relation to each other longitudinally of the casing between the baffle plates, each of said separator elements comprising a plurality of vertically-spaced inclined plates forming the top and bottom walls of a plurality of parallel passages for the liquid, a screen covering the lower side of each plate whereby along the top wall of each passage are formed recesses which lie in the surface of liquid flowing therethrough and in which recesses foreign floating particles may lodge, and binding means for the separator elements extending between the top and bottom walls of the casing.

6. In a liquid separator, a casing having top and bottom walls, a transverse substantially vertical baffle plate within the casing forming an admission chamber at one end thereof, said baffle plate joining the bottom wall of the casing and terminating short of the top wall, said baffle plate being provided with openings adjacent its lower edge, an admission conduit depending within said chamber and terminating adjacent the bottom wall, a transverse substantially vertical baffle plate within the casing forming a discharge chamber at the opposite end thereof, a liquid well in the bottom wall of the casing into which the last-named baffle plate depends to form a liquid seal, discharge conduits projecting through the bottom wall of the casing upwardly into the discharge chamber and terminating above the liquid well, a plurality of transverse separator elements through which the liquid flows arranged in spaced relation to each other longitudinally of the casing between the baffle plates, each of said separator elements comprising a plurality of vertically-spaced inclined plates forming parallel passages, a screen covering the lower side of each plate, a plurality of spacing washers between each screen and an adjacent lower plate and a plurality of tie rods extending between the top and bottom walls of the casing for binding the screens and plates into a unitary assembly, and transverse spacing means for the separator elements secured to the casing walls.

In witness whereof, I have hereunto set my hand this 24th day of April, 1923.

WILLIAM L. R. EMMET.